Oct. 28, 1969   W. A. BEDFORD, JR   3,474,847
SCREW RETAINER
Filed June 20, 1968   2 Sheets-Sheet 1
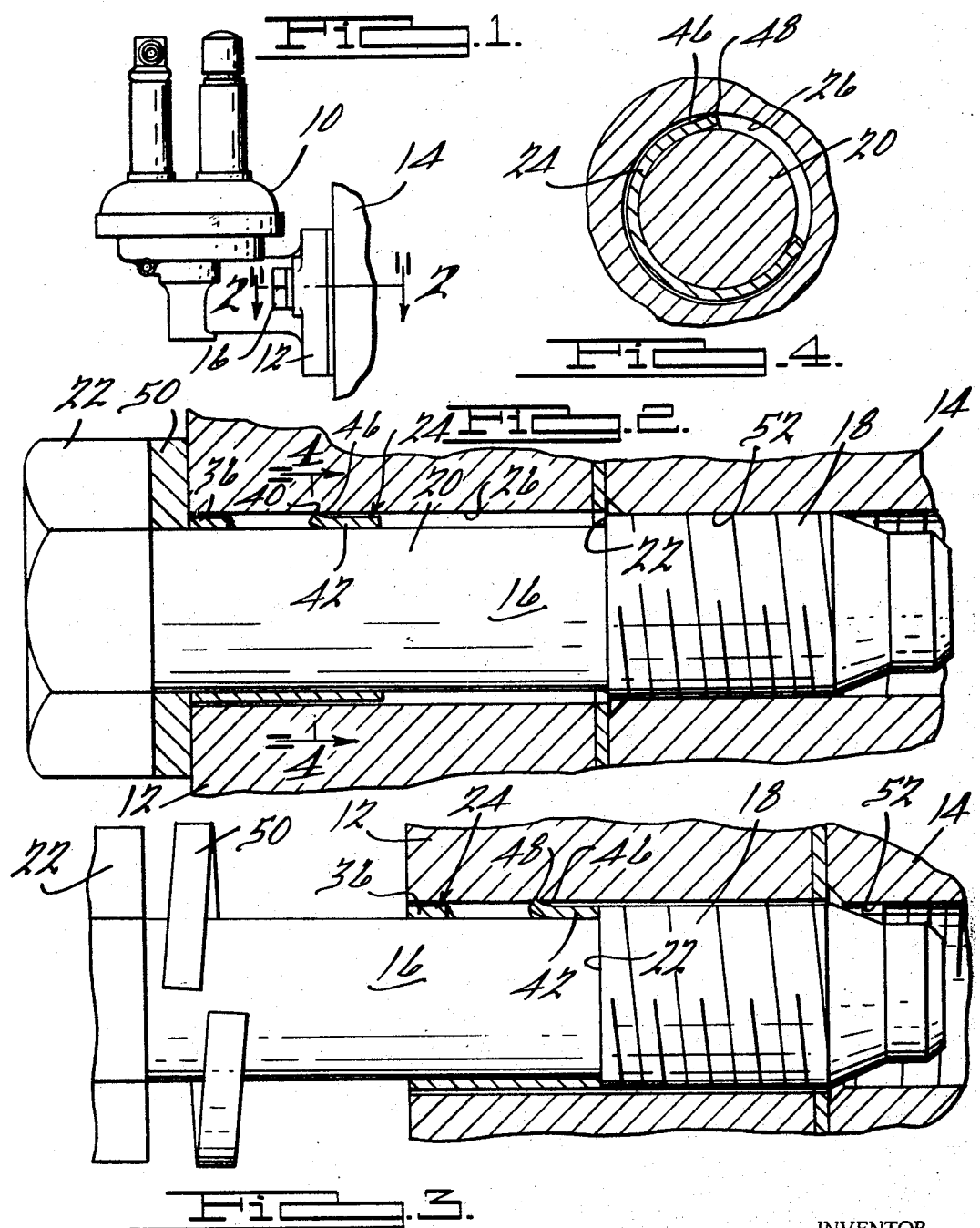
INVENTOR.
William A. Bedford
BY
Harness, Dickey & Pierce
ATTORNEYS Oct. 28, 1969  W. A. BEDFORD, JR  3,474,847
SCREW RETAINER
Filed June 20, 1968  2 Sheets-Sheet 2
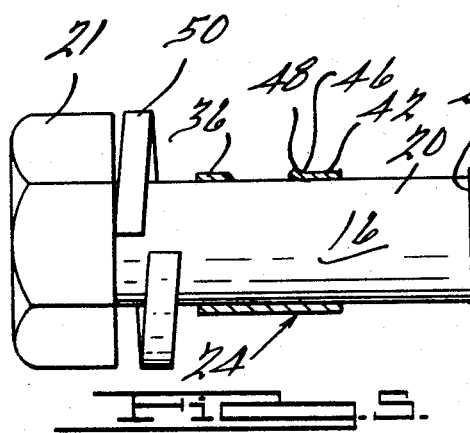
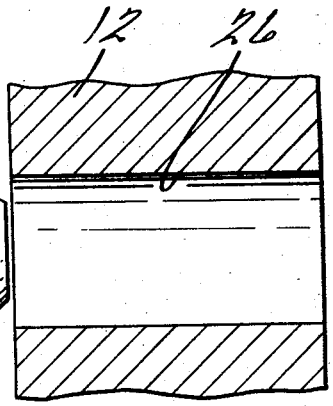
FIG. 5.
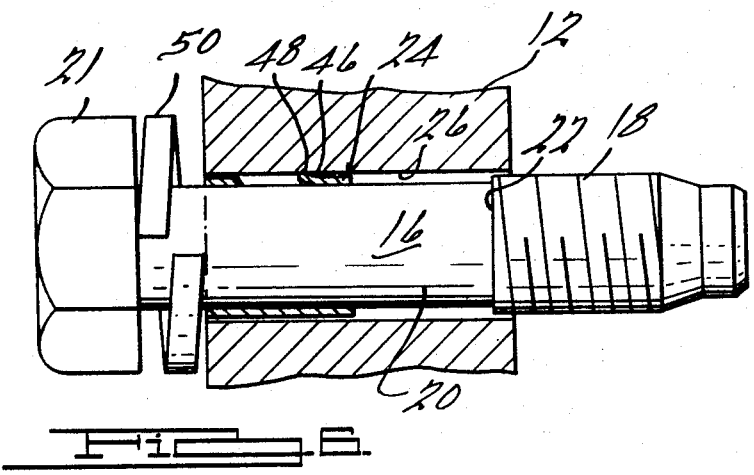
FIG. 6.
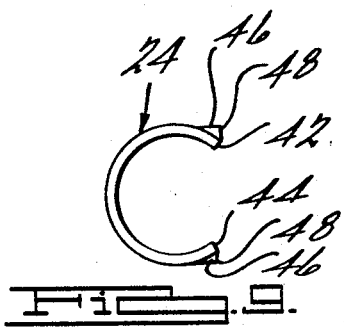
FIG. 9.
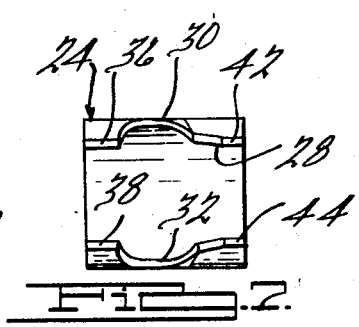
FIG. 7.
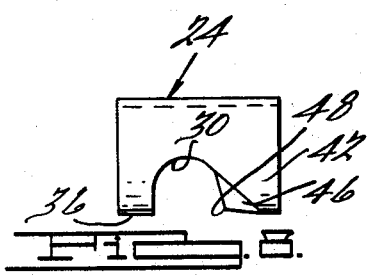
FIG. 8.
INVENTOR.
William A. Bedford
BY
Harness, Dickey & Pierce
ATTORNEYS.

United States Patent Office 3,474,847
Patented Oct. 28, 1969

3,474,847
SCREW RETAINER
William A. Bedford, Jr., Sarasota, Fla., assignor, by mesne assignments, to Microdot Inc., New York, N.Y., a corporation of California
Filed June 20, 1968, Ser. No. 738,529
Int. Cl. F16b 41/00
U.S. Cl. 151—69                              1 Claim

ABSTRACT OF THE DISCLOSURE

The disclosure relates to a retainer for holding a screw in an unthreaded bore in a structural element.

BACKGROUND OF THE INVENTION

It has long been a problem in fastening together metal members which are to be fastened by machine screws to maintain the machine screw in one of the members and to prevent it from falling out during handling and assembly operations or when the machine screw is unthreaded from one of the members during disassembly operations.

SUMMARY OF THE INVENTION

The present invention successfully solves the above-mentioned problem in an inexpensive and uncomplicated way of providing a screw retainer that fits over an unthreaded portion of the machine screw. The screw retainer is preferably in the form of a sleeve having an inner diameter substantially equal to the outer diameter of the unthreaded portion of the screw and it is longitudinally slit so that it may be forced radially over the unthreaded portion. It has radially extending gripping teeth or edges that are adapted to bite into an unthreaded bore in a member which is to be fastened to another member having a threaded bore. Preferably, the sleeve is of substantially less length than the length of the unthreaded portion of the screw and it is positioned on the unthreaded portion of the machine screw adjacent the threads. When the machine screw is positioned within the unthreaded bore in one of the members, the gripping edge that extends toward the head of the bolt will engage the wall of the unthreaded bore and will grip it so that the bolt will not fall out of the unthreaded bore during assembly operations.

Thereafter, if the screw is removed from the other member with the threaded bore, the sleeve will slide relative to the unthreaded portion of the screw as the screw is backed out of the threaded bore due to the gripping edges engaging the unthreaded bore in the one member. It thereby retains the screw in the portion with the unthreaded bore during this disassembly operation so that the bolt will not be accidentally dislodged from the unthreaded bore and so that the screw may readily be realigned with and screwed into the threaded bore in the other member when the parts are again assembled.

An object of the present invention is the provision of a screw retainer for retaining a screw in an unthreaded bore in one member that is adapted to be fastened to another member.

A further object of the invention is the provision of a combination screw and screw retainer in which the screw retainer will retain the screw in an unthreaded bore in a member that is to be fastened to another member having a threaded bore positioned therein.

Other objects and attendant advantages of the present invention may be more readily realized as the specification is considered in connection with the attached drawings in which:

FIGURE 1 discloses a pair of members which are adapted to be fastened together, for example, a fuel pump and an engine of an automotive vehicle;

FIG. 2 is a sectional view taken along the lines 2—2 of FIG. 1 and showing the screw of the invention retaining the two members together;

FIG. 3 is a view similar to FIG. 2 but showing the screw in the unthreaded position;

FIG. 4 is a sectional view taken along the lines 4—4 of FIG. 2;

FIG. 5 shows the screw and screw retainer prior to being inserted in an unthreaded bore;

FIG. 6 is a view similar to FIG. 5 but showing the screw inserted in the unthreaded bore;

FIG. 7 is a side elevational view of the screw retainer of the present invention;

FIG. 8 is a side elevational view with the screw retainer rotated 90° with respect to its position shown in FIG. 5; and FIG. 9 is an end elevational view of the screw retainer of the present invention.

Referring now to the drawings in which like reference numerals designate like parts throughout the several views thereof, there is shown in FIG. 1, a fuel pump 10 having an attaching flange 12 which is affixed to a portion 14 of an internal combustion engine by means of a machine screw 16. It is to be understood, of course, that another machine screw similar to the machine screw 16 may be positioned opposite the main body portion of the pump to attach the attaching flange 12 to the portion 14 of the internal combustion engine.

The machine screw 16 has a threaded portion 18, an unthreaded portion 20 and a head 21. As shown, the threaded portion 18 is larger in diameter than the unthreaded portion 20 thereby forming a shoulder 22 at the junction of the threaded portion and the unthreaded portion.

A screw retainer 24 is positioned over the unthreaded portion 20 of the screw 16, and it comprises a metallic sleeve having a length substantially less than the length of the unthreaded portion 20. The outer diameter of the sleeve is substantially equal to the diameter of the threaded portion 18 and is slightly less than the unthreaded bore 26 positioned in the attaching flange 12, while the inner diameter is substantially equal to the diameter of the unthreaded portion 20. The sleeve has a longitudinally extending slot 28 positioned therein which has a width that is slightly smaller than the diameter of the unthreaded portion 20 of the machine screw 16.

The sleeve forming the screw retainer 24 also has a pair of slots 30 and 32 that open into the slot 28 and extend in a peripheral direction with respect to the sleeve thereby forming first a pair of spaced arms 36 and 38 and a second pair of spaced arms 42 and 44 at the ends of the sleeve retainer. Each of the spaced arms 42 and 44 has a radially outwardly extending tongue 46 that has a gripping edge 48 extending in a direction toward the head 21 of the machine screw 16 when the sleeve 24 is positioned on the unthreaded portion 20 of the machine screw.

The screw retainer 24 may be formed of a sheet material, for example, SAE 1050 steel, so that it has substantial resiliency and may be forced radially over the unthreaded portion 20 of the machine screw 16. When this is done, the pair of spaced arms 36 and 38, 42 and 44 are spread apart and then when the screw retainer 24 has been positioned over the unthreaded portion 20 of the machine screw 16, the arms 36, 38 and 42, 44 spring back together to retain the screw retainer 24 on the unthreaded portion 20 of the machine screw 16.

As shown by the drawings, the structural member 14 that forms a portion of an internal combustion engine has a threaded bore 50 positioned therein for receiving the threaded portion 18 of the machine screw 16.

During assembly operations, the screw retainer 24 is positioned on the unthreaded portion 20 of the machine screw 16 as described above and in the position shown in FIG. 5. The machine screw 16 is then positioned in the unthreaded bore 26 into the position shown in FIG. 6 by moving it axially to the right from the position shown in FIG. 5 to the position shown in FIG. 6. As this occurs, the gripping edges 48 of the gripping teeth 46 deflect sufficiently to permit the screw 16 and the screw retainer 24 to slide into the unthreaded bore 26. The end of the screw retainer engages the lock washer 52, if such is used, or the underside of the head 21 so that the retainer sleeve 24 is forced into the position shown in FIG. 6. This operation takes place prior to assembly so that the machine screw 16 is retained in the unthreaded bore 26 prior to the time that the mounting flange 12 is positioned against the member 14 thereby retaining the screw 16 in the unthreaded bore 26. The retaining function is performed by the gripping edges 48 that bite into and grip the inner wall 26 of the unthreaded bore 26.

It is apparent, however, that the machine screw 16 may be pulled axially to the left from the position shown in FIG. 6 prior to assembly operations to facilitate the insertion of the threaded portion 18 of the machine screw into the threaded bore 52 in the mounting structure 14. If the assembler so desires, it may be moved axially to the left to the position shown in FIG. 3, and this will occur when the fuel pump is placed into position to be mounted on the mounting structure 14 even if the assembler has not previously done so by the engagement of the threads on the threaded portion 18 with the threads of the threaded bore 52. Thereafter, a wrench is placed over the head 21 of the screw 16 and the screw 16 is rotated so that the threaded portion 18 is threaded into the threaded bore 52. During this motion, the retainer 24 may be driven to the right as viewed in FIGS. 2 and 3 or it may retain its position shown therein so that when the assembly operations are completed, the screw retainer 24 may be positioned as shown in FIG. 2. It should be apparent however, that the screw retainer may be positioned anywhere along the unthreaded portion 20 of the retaining screw 16.

During disassembly operations, the shoulder 22 formed between the unthreaded portion 20 and the threaded portion 18 of the machine screw 16 will engage the end of the screw retainer 24 and drive it back to the position shown in FIG. 3, if it had previously been moved axially to the right. This occurs when the distssembly operation is complete and the threaded portion 18 of the bolt 16 is completely unthreaded from the threaded bore 52 as shown in FIG. 3.

It can be appreciated, therefore, that during the unthreading operation, the gripping edge 48 of the screw retainer 24 may slide to the left in the internal bore 26 due to the force exerted by the shoulder 22 during this type operation. The screw retainer 24, however, will retain the bolt 16 in the threaded bore 26, when dissassembly operations have been completed and the fuel pump is laid to one side or is repaired.

When the repair operations have been completed and the fuel pump 10 is again positioned so that it may be attached to the mounting structure 14, the position of the parts will be that illustrated in FIG. 3. After the machine screw 16 has been rotated so that the threaded portion 18 is threaded into the bore 52, the position of the parts will again be that shown in FIG. 2 or as explained above, the screw retainer 24 may be positioned further axially to the right on the unthreaded portion 24 of the machine screw 16.

It can be appreciated that with the present invention, the machine screw 16 may be mounted in the internal unthreaded bore 26 in a structure, for example, the flange 20 of the fuel pump 10 prior to assembly operations. The screw retainers 24 will prevent the machine screw from becoming dislodged from the internal bore in the mounting structure, for example, the internal bore in the mounting flange 12 of the fuel pump 10, as the assembler takes each fuel pump and attaches it to an engine as the engine moves down an assembly line. The screw retainer 24 of the invention also retains the screw in the internal bore in the structure, for example, in the internal bore of the mounting flange of the fuel pump during disassembly operations that may be necessary when repairs are to be made to the fuel pump.

Thus, the present invention provides an inexpensive and uncomplicated screw retainer for retaining a machine screw in an unthreaded bore in a member that is to be joined to another member during assembly and disassembly operations.

While it will be apparent that the preferred embodiment of the invention herein disclosed is well calculated to fulfill the objects above stated, it will be appreciated that the invention is susceptible to modification, variation and change.

What is claimed is:
1. A machine screw and retainer assembly comprising:
   a machine screw having a head, a cylindrical body portion having a threaded end portion remote from said head, and an intermediate unthreaded portion and,
   a headless screw retainer positioned on the intermediate unthreaded portion of said screw comprising a sheet metal sleeve having a longitudinal slot therein positioned around the unthreaded body portion of said screw, the slot in said sleeve being narrower than the diameter of the unthreaded portion of said screw but sufficiently wide to permit assembly of said retainer with said screw by radial movement of said sleeve relative to said screw, said sleeve including a pair of radially outwardly extending tongues at the end thereof remote from the head of said screw, each of said tongues having a gripping edge extending toward the head of said screw adapted to bite and grip the inner wall of a bore in a structural member adapted to be fastened to another structural member, the length of said sheet metal sleeve being substantially less than the length of the intermediate unthreaded portion of said screw, whereby said sleeve may slide on the intermediate unthreaded portion of said machine screw when the threaded portion thereof is threaded into and out of a threaded bore, the diameter of the threaded portion of said screw being larger than the diameter of the unthreaded portion and substantially equal to the external diameter of said sleeve to thereby form a shoulder that is engageable with one end of said sleeve.

References Cited
UNITED STATES PATENTS

| | | | |
|---|---|---|---|
| 1,409,606 | 3/1922 | Stendahl | 151—69 |
| 2,438,499 | 3/1948 | Hartman | 85—5 |
| 3,138,188 | 6/1964 | Tuozzo et al. | 151—69 |
| 3,156,281 | 11/1964 | Demi | 151—69 |

EDWARD C. ALLEN, Primary Examiner